United States Patent [19]
Mochizuki

[11] Patent Number: 6,016,396
[45] Date of Patent: *Jan. 18, 2000

[54] PARALLEL CODE CONVERSION PROCESSING METHOD AND PARALLEL CODE CONVERSION PROCESSING SYSTEM

[75] Inventor: Tomoaki Mochizuki, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/555,137

[22] Filed: Nov. 8, 1995

[30] Foreign Application Priority Data

Nov. 8, 1994 [JP] Japan ..................................... 6-273852

[51] Int. Cl.[7] ..................................................... G06F 5/00
[52] U.S. Cl. .............................. 395/706; 709/246; 341/50
[58] Field of Search ..................................... 395/705, 706, 395/701, 676, 675; 341/50, 88, 62, 83–85, 100, 101, 104, 105; 709/6, 7, 246

[56] References Cited

U.S. PATENT DOCUMENTS

| | | |
|---|---|---|
| 4,809,170 | 2/1989 | Leblang et al. . |
| 4,951,192 | 8/1990 | Chase, Jr. et al. ....................... 395/706 |
| 5,155,851 | 10/1992 | Krishnan ................................. 395/650 |
| 5,357,632 | 10/1994 | Pion et al. .............................. 395/650 |
| 5,452,461 | 9/1995 | Umekita et al. ........................ 395/706 |
| 5,535,387 | 7/1996 | Matsuoka et al. ...................... 395/675 |
| 5,535,393 | 7/1996 | Reeve et al. ............................ 395/706 |
| 5,598,561 | 1/1997 | Funaki ..................................... 395/706 |

*Primary Examiner*—Thomas M. Heckler
*Attorney, Agent, or Firm*—Staas & Halsey LLP

[57] ABSTRACT

When code information is sent from a companion computer system that uses a specific code scheme to a host computer system that uses a code scheme different from the specific code scheme, this code information is input to the input unit of the host computer system. A distribution unit distributes this code information to a plurality of conversion units. The conversion units subject the distributed code information to conversion processing into the code scheme used in the host computer system.

26 Claims, 14 Drawing Sheets

| ISO CODE | EBCDIC CODE ||||||
| --- | --- | --- | --- | --- | --- | --- |
| | EBCDIC (JAPANESE KANA) | EBCDIC (ASCII) | EBCDIC (ROMAN LETTERS, LOWER CASE) | EBCDIC (US) | EBCIDC (CHINESE) | EBCDIC (KOREAN) |
| ISO 646 IRV | ① | ○ | ○ | ○ | ○ | ① |
| ASCII | ① | ○ | ○ | ○ | ○ | ① |
| JIS ROMAN LETTERS | ① | ○ | ○ | ○ | ○ | ① |
| JIS KATAKANA | ② | × | × | × | × | × |
| JIS 8 UNITS | ③ | ① | ① | ① | ① | ① |

FIG. 12

| CODE CONVERTED FROM | CODE CONVERTED INTO | | | | |
| --- | --- | --- | --- | --- | --- |
| | ISO646IRV | ASCII | JIS ROMAN LETTERS | JIS KATAKANA | JIS 8 UNITS |
| ISO 646 IRV | \ | ① | ① | × | ①  ~a |
| ASCII | ① | \ | ① | × | ① |
| JIS ROMAN LETTERS | ① | ① | \ | × | ○  ~b |
| JIS KATAKANA | × | × | × | \ | ○ |
| JIS 8 UNITS | ② | ② | ③ | ④ | \  ~f |
| | c | | d | e | |

FIG. 13

PARALLEL CODE CONVERSION PROCESSING METHOD AND PARALLEL CODE CONVERSION PROCESSING SYSTEM

BACKGROUND OF THE INVENTION

1. Field of the Invention

The present invention relates to a parallel code conversion processing method and a parallel code conversion processing system. The present invention more particularly relates to a parallel code conversion processing method and system for transferring information of a given content at high speed between computer systems having different code schemes.

2. Description of the Related Art

Information systems in which a large quantity of information is transferred between computer systems of different code schemes have been used in recent years in order to make the overall information system more efficient.

When information is exchanged between computer systems having different code schemes in this type of information system, the format of the information must be converted into a code scheme that can be utilized by the computer system on the side receiving the data. This conversion requires that each computer system be provided with a code conversion processor.

FIG. 14 is a block diagram of an example of such a code conversion processor.

The code conversion processor shown in FIG. 14 is provided with an input/output processing unit 50 that processes the signals input to and output from the computer system that is provided with this code conversion processor (the host computer system), and with a data writing unit 51 that has a region to be written with the data processed by the input/output processing unit 50.

The input/output processing unit 50 comprises a single processor, for example. This input/output processing unit 50 receives information that has been output from a companion computer system that utilizes JEF code as its standard, for example, converts this information into SJIS code of the same meaning, and outputs the converted information to the host computer system that utilizes SJIS code as its standard. This input/output processing unit 50 comprises an input unit 52 into which is input the information output from the companion computer system, a code conversion unit 53 that converts, in record units, the code scheme of the information received from the input unit 52 from JEF code into SJIS code, for example, and an output unit 54 that outputs the code information that has been converted in code scheme from JEF code into SJIS code by the code conversion unit 53.

Meanwhile, the data writing unit 51 is provided with a data base 55 composed of a plurality of magnetic disk devices.

With this type of information system, when the information output from the companion computer system is input to the input unit 52 of the input/output processing unit 50 of the host computer system, the code scheme of this input information is converted by the code conversion unit 53 from JEF code into SJIS code, for example. When this code information that has been sent from the code conversion unit 53 is received, the output unit 54 converts this code information into an output signal. The output unit 54 then writes the information of the output signal in record units to a specified writing region of the data base 55 within the data writing unit 51.

However, with the information system described above, since the input of information, code conversion, and the output of information are executed in order by a single processor, the time it takes to convert a code scheme of the input information to different one increases along with the amount of information, so there is the possibility of diminished response of the information system as a whole.

In particular, since conversion processing from one code scheme to different one is what accounts for the majority of the processing involved in this type of information system, the processing speed for conventional processing had to be increased to increase the response of the overall processing, when the data of a companion computer system with a certain code scheme had to be converted to the data of the host computer system of different code scheme.

SUMMARY OF THE INVENTION

The present invention was conceived in light of this problem, and an object thereof is to provide a parallel code conversion processing method and a parallel code conversion processing system that allow high-speed processing by performing data transfer between computer systems of different code schemes at high speed.

The present invention utilizes the following means to solve the above problem.

The first aspect of the parallel code conversion processing method of the present invention is a method for converting the code scheme of code information sent from one computer system into the code scheme used in another computer system. The method comprises the steps of distributing the code information sent from the first computer system to a plurality of processing units, and converting the code scheme of the distributed code information into the code scheme used by the other computer system in parallel by the processing units.

The present invention is not limited to the conversion of 1-byte code, and can also be applied to the code conversion of 2-byte code or other multi-byte code.

For example, code information that has been converted from JEF code into SJIS code is output as write information, and is written to the data write region in whatever units which are written to the data write region, such as in record units.

Code conversion is not limited to this example alone, and the converted code scheme can be any code scheme as long as the code information of the converted code scheme has the same meaning as that of original code scheme.

Also, the code information that is written to the data write region is not limited to record units, and may be in any units that can be written to this write region.

The second aspect of the parallel code conversion processing method of the present invention further comprises the step of storing the code information that is undergone the converting step in a storage medium of the other computer system.

In the third aspect of the parallel code conversion processing method of the present invention, the storage medium of the other computer system to which the code information is written is designated ahead of time.

In the fourth aspect of the parallel code conversion processing method of the present invention, only a keyword in the code information is converted into code information of the code scheme used in the other computer system and the code information is then distributed to the processing unit corresponding to the keyword of which code scheme was converted, in the course of the code information being distributed to the plurality of processing units.

In the fifth aspect of the parallel code conversion processing method of the present invention, the code information is distributed to a number of processing units corresponding to the amount of data in the code information.

The sixth aspect of the parallel code conversion processing method of the present invention further comprises the step of joining the various pieces of code information that are undergone the converting step into a single group of code information.

The seventh aspect of the parallel code conversion processing method of the present invention is the method for converting the code scheme of code information stored in a distributed state in a plurality of storage media within one computer system into the code scheme used in another computer system. The method comprises the steps of reading the code information stored in a distributed state in each storage media, converting the code scheme of pieces of the read code information into the code scheme used in the other computer system in parallel, and joining the pieces of code information that are undergone the converting step into a single group of code information.

In the eighth aspect of the parallel code conversion processing method of the present invention, the order of the code information that is undergone the converting step is rearranged in the course of the joining.

The first aspect of the parallel code conversion processing system of the present invention is a system for converting the code scheme of code information sent from one computer system into the code scheme used in another computer system. The system comprises a distribution unit that distributes the code information sent from the one computer system into a plurality of pieces and a plurality of conversion units that execute, in parallel with each other, conversion processing in which the code scheme of the code information distributed by the distribution unit is converted into the code scheme used in the other computer system.

The second aspect of the parallel code conversion processing system of the present invention further comprises a plurality of storage media in which the various pieces of code information that are undergone the conversion processing by the conversion units are each stored.

In the third aspect of the parallel code conversion processing system of the present invention, the distribution unit distributes the code information to previously designated conversion units.

In the fourth aspect of the parallel code conversion processing system of the present invention, the distribution unit converts only a keyword from the code information into code information of the code scheme used in the other computer system, and then distributes the code information to the conversion unit corresponding to the keyword of which code scheme was converted.

In the fifth aspect of the parallel code conversion processing system of the present invention, the distribution unit distributes the code information to a number of processing units corresponding to the amount of data in the code information.

The sixth aspect of the parallel code conversion processing system of the present invention further comprises a joining unit that joins the various pieces of code information that are undergone the conversion processing into a single group of code information.

The seventh aspect of the parallel code conversion processing system of the present invention is a system for converting the code scheme of code information stored in a distributed state in a plurality of storage media within one computer system into the code scheme used in another computer system. The system comprises a read unit that reads the code information stored in a distributed state in the plurality of storage media, a plurality of conversion units that execute, in parallel with each other, conversion processing in which the code scheme of the code information read by the read unit is converted into the code scheme used in the other computer system, and a joining unit that joins the various pieces of code information that are undergone the conversion processing into a single group of code information.

In the eighth aspect of the parallel code conversion processing system of the present invention, the joining unit rearranges the order of the code information that are undergone the conversion processing in the course of the joining.

According to the first aspect of the parallel code conversion processing method of the present invention, firstly, the code information sent from the first computer system is divided in the plurality of the pieces and distributed to a plurality of processing units, successively the code scheme of the distributed pieces of the code information are converted into the code scheme used by the other computer system in parallel by the processing units.

According to the seventh aspect of the parallel code conversion processing method of the present invention, firstly, the code information stored in a distributed state in each storage median is read, successively, the code scheme of pieces of the read code information is converted into the code scheme used in the other computer system in parallel, then the pieces of code information that are undergone the converting step are joined into a single group of code information.

According to the first aspect of the parallel code conversion processing system, the distribution unit distributes the code information sent from the one computer system into a plurality of pieces, and the plurality of conversion units execute, in parallel with each other, conversion processing in which the code scheme of the code information distributed by the distribution unit is converted into the code scheme used in the other computer system.

According to the seventh aspect of the parallel code conversion processing system, the read unit reads the code information stored in a distributed state in the plurality of storage media, the plurality of conversion units execute, in parallel with each other, conversion processing in which the code scheme of the code information read by the read unit is converted into the code scheme used in the other computer system, and the joining unit joins the various pieces of code information that are undergone the conversion processing into a single group of code information.

As described above, the code information thus distributed or thus read from the storage media can be converted in parallel by the code conversion unit from JEF code into SJIS code of the same meaning, for example.

Therefore, this parallel code conversion processing method or parallel code conversion processing system allows information to be transferred between systems of different code schemes in a short time, and allows the response to be increased over an entire computer system composed of a plurality of systems.

Also, code information that has been converted from JEF code into SJIS code, for example, can be output as write information, and can be written to the data write region in whatever units are written to the data write region, such as in record units.

As a result, the processing time up to the point of data writing can be shortened.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 12 is a diagram of an example of code conversion that is used to illustrate a specific example of a embodiment of the information;

FIG. 13 is a diagram of an example of code conversion that is used to illustrate a specific example of a embodiment of the information.

DESCRIPTION OF THE PREFERRED EMBODIMENTS

Embodiments of the present invention will now be described in reference to the figures.

First Embodiment

In the parallel code conversion processing system pertaining to the first embodiment, the input information that has been input from the companion computer system is distributed to a plurality of processors processing is executed in parallel by the processors in order to convert the input information into code information of a different code scheme but the same meaning. As a result, the processor within the host computer system can be efficiently assigned the information to each processing unit, and the resources of the host system can be utilized more effectively.

Also, since the conversion of the input information into the code information of the different code scheme but the same meaning is accomplished by the code conversion unit in each processing unit, the transfer of information between systems of different code schemes is effected in a shorter time, and there is an increase in the processing response of a computer system comprising a plurality of systems.

Construction of First Embodiment

Figure 1:
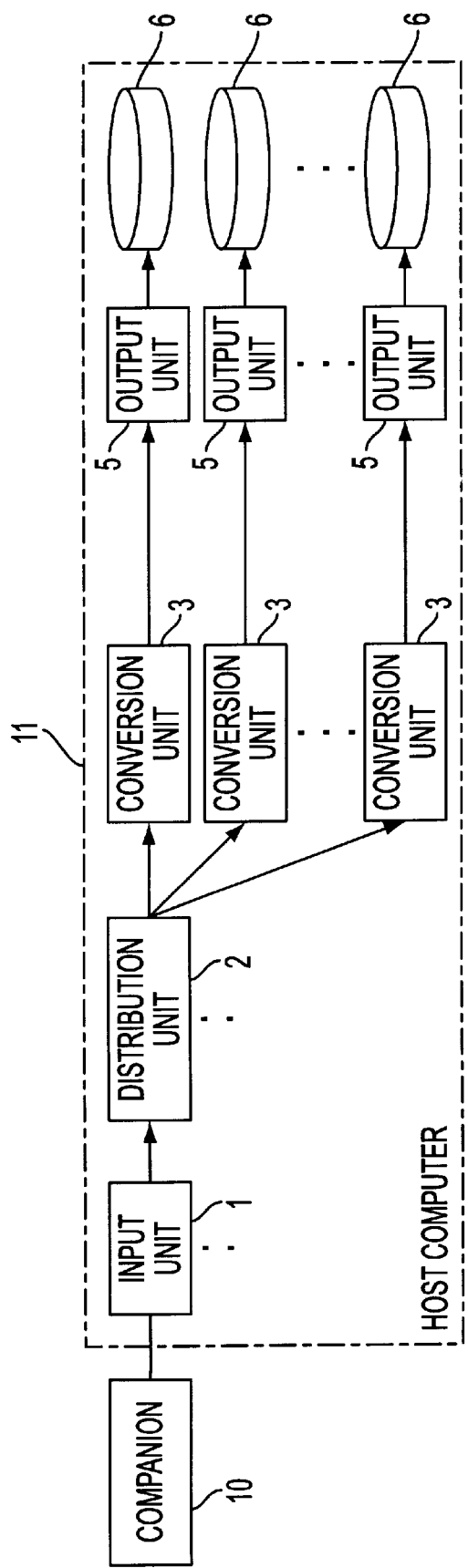
FIG. 1 is a block diagram illustrating the essentials of the first embodiment of the present invention.

FIG. 1 is a block diagram of the first embodiment of the present invention. In FIG. 1, code information of a specific code scheme that has been sent from a companion computer system 10 to a host computer system 11 is input to an input unit 1.

In a distribution unit 2, the code information input to the input unit 1 is distributed for a plurality of conversion units 3 based on the input information sent from the companion computer system. Here, "distributed" means that the data are divided up and transferred to a plurality of processors. As a result, the distribution unit 2 assigns the code information more efficiently to the processor within the host computer system 11, and the resources of the host computer system can be utilized more effectively.

The conversion units 3 convert the distributed code information into code information of a different code scheme but the same meaning. Therefore, since the conversion of the code scheme is executed in parallel and simultaneously by the plurality of conversion units 3, the transfer of information between systems of different code schemes is carried out in a shorter time. As a result, the conversion units 3 make it possible to increase the processing response of an information system comprising a plurality of computer systems.

Output units 5 receive respectively corresponding code information that has been converted by the conversion units 3, and output to respectively corresponding data bases the write signals that are used to write the code information to a data base 6.

Figure 2:
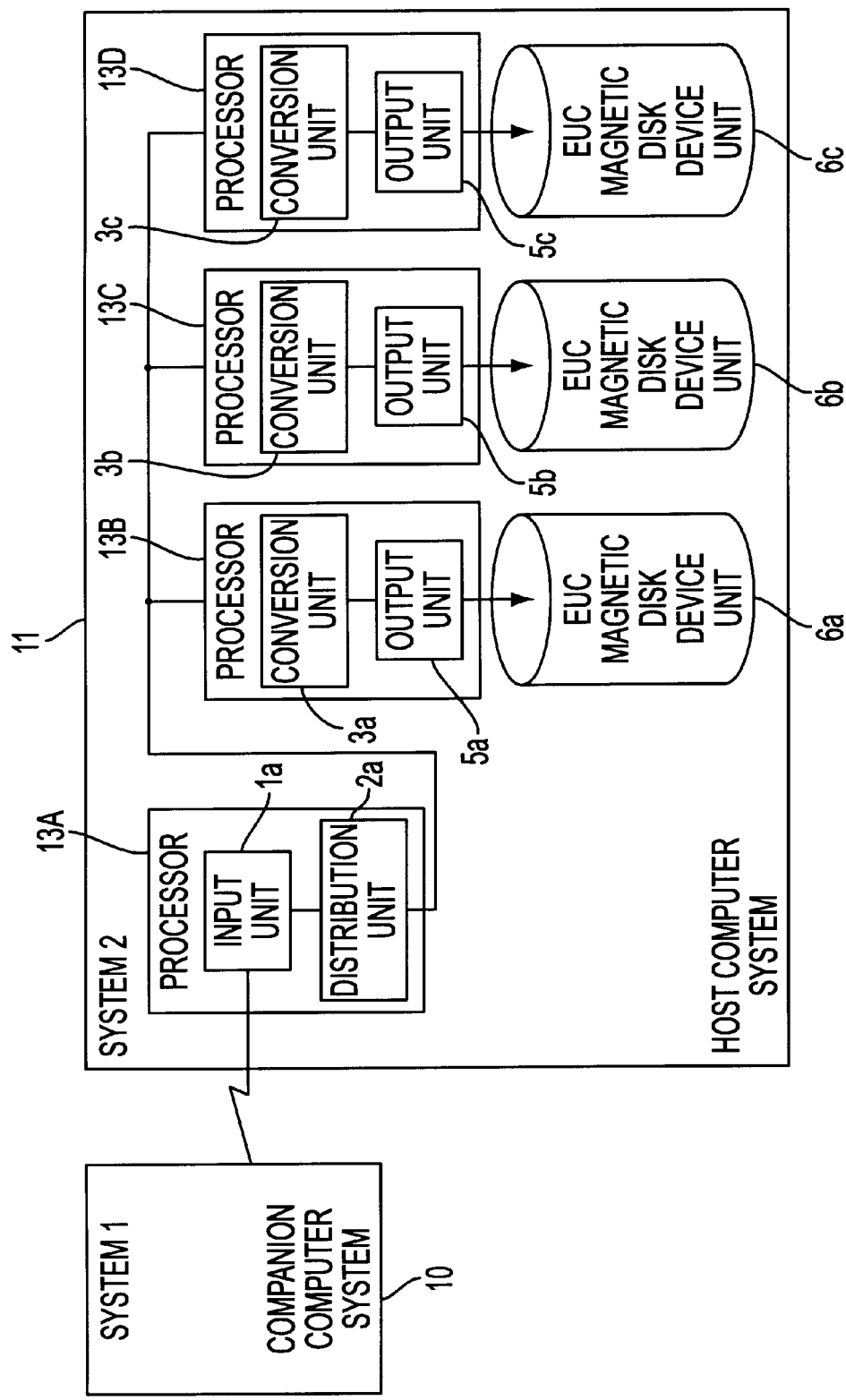
FIG. 2 is a block diagram illustrating a specific construction of the first embodiment of the present invention.

FIG. 2 is a block diagram that shows the system in FIG. 1 in greater detail. In this block diagram, the system 1 is a companion computer system 10, and the system 2 is the host computer system 11.

Here, for example, the companion computer system is defined as being a computer that makes use of JEF code as its standard code scheme, and the host computer system 11 is defined as being a computer that makes use of SJIS code as its standard code scheme.

This host computer system 11 is provided with a first processor 13A and second processors 13B through 13D in order to distribute the system control into two stages. The host computer system 11 is also provided with magnetic disk device units 6a through 6c, in which code information is written in file units in response to a control command from the second processors.

The first processor 13A comprises an input unit 1a that receives via a communication line or the like the code information that has been sent from the companion computer system 10, and a distribution unit 2a that selects from among the plurality of second processors 13B through 13D and distributes the code information received by the input unit 1a.

Meanwhile, the second processors 13B through 13D comprise conversion units 3a through 3c that are used to convert the code information that has been distributed by the distribution unit 2a of the first processor 13A into code information of a different code scheme, and output units 5a through 5c that are used to output code information that has been converted from a JEF code scheme into an SJIS code scheme, for example, with the meaning remained by the code conversion of the conversion units 3a through 3c.

Code information that has been output from the output units 5a through 5c is written in file units to the magnetic disk device units 6a through 6c, respectively.

This embodiment can be applied to not only the code conversion of 1-byte code but also the code conversion of 2-byte code or other multi-byte code.

Operation of the First Embodiment

Figure 3:
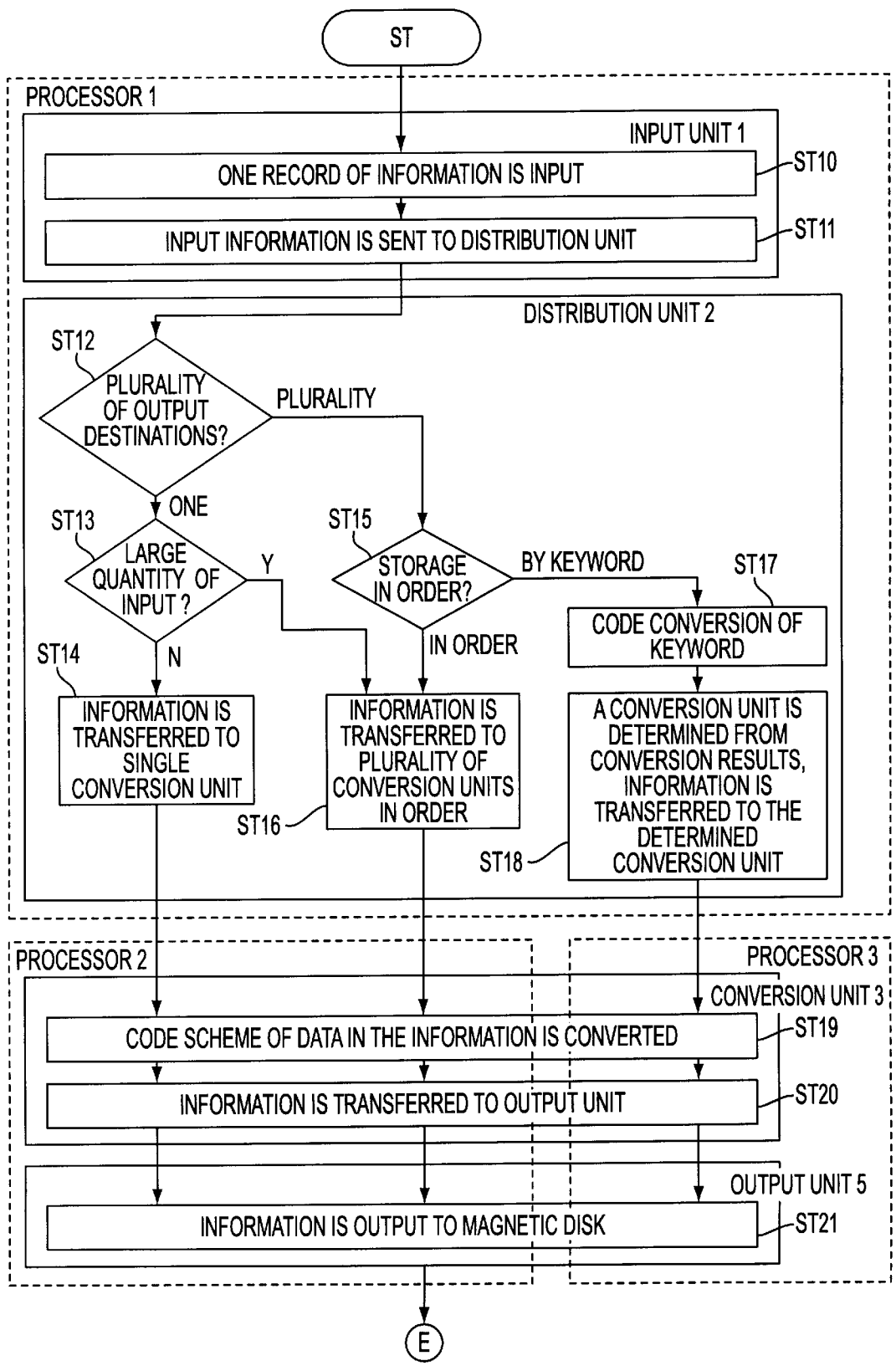
FIG. 3 is a flow chart illustrating the operation of the first embodiment of the present invention.

The operation of the first embodiment will be described in reference to FIG. 3.

In this embodiment, one record of code information from the companion computer system 10 is input to the input unit 1 of the host computer system 11 (ST10).

After the one record of code information has been input to the input unit 1, the input code information is sent to the distribution unit 2 (ST11).

This distribution unit 2 selects from among the plurality of second processors 13B through 13D that operate the magnetic disk device units 6a through 6c, and distributes the code information received by the input unit 1a to the selected second processors 13B through 13D. With this distribution unit 2, a decision is first made as to whether one or a plurality of the processors 13B through 13D will be the distribution destinations, that is, the output destinations (ST12). When it is determined that there is just one output destination, a decision is made as to whether the total number of the records that have been input is large or not (ST13). Here, the criterion for determining whether the total number of the records is large or not is the magnitude of the blocking coefficient that determines how large information can be stored by a magnetic storage medium 6. The determination of this blocking coefficient is based, for example, on the balance between an increase in apparent memory density of the magnetic storage medium 6 and an increase in input/output speed resulting from a reduction in the number of read or write operations.

When the total number of the input records is not large (No in ST13), the code information is sent to only a specific conversion unit 3a of the processor 13B (processor 2) (ST14). After the information has been sent only to this specific conversion unit 3a of the processor 13B (processor 2), the code scheme of the data is converted by the code conversion unit 3a of the processor 13B (processor 2) (ST19).

Meanwhile, when it is determined in ST12 that a plurality of the processors 13B through 13D will be the distribution destinations, that is, the output destinations, a decision is made as to whether the code information will be distributed and stored in the magnetic disk device units 6a through 6c according to the input order, or according to a keyword contained in the code information (ST15).

When the code information is distributed and stored in the magnetic disk device units 6a through 6c according to the input order, the code information that has been input is sent, in order, to the plurality of code conversion units 3a through 3c (ST16).

The code conversion units 3a through 3c of the processors 13B through 13D convert the code scheme of the data in the received code information into the code scheme that is used as the standard code scheme in the host computer system 11 (ST19).

When it is determined that the code information will be distributed and stored in the magnetic disk device units 6a through 6c in ST15 according to a keyword contained in the code information, only the code scheme of the keyword is converted into that used in the host computer system 11 at first (ST17).

The distribution unit 2a, after performing the code conversion of the keyword, determines the code conversion units 3a through 3c based on the code conversion results, and sends the code information to the determined code conversion units 3a through 3c (ST18).

The code conversion units 3a through 3c of the processors 13B through 13D convert the code scheme of the data in the received code information into the code scheme that is used as the standard code scheme in the host computer system 11 (ST19). For example, they convert the code information from ASCII code to JIS code of the same meaning.

Meanwhile, when it is determined in ST13 that the total number of the input records is large (Yes in ST13), the input code information is sent, in order, to the plurality of code conversion units 3a through 3c (ST16).

In ST19 described above, after the code conversion units 3a through 3c of the processors 13B through 13D have converted the code scheme of the code information, the code information is transferred to the output units 5a through 5c (ST20).

After these output units 5a through 5c have received the code information, the converted code information is sent to the magnetic disk device units 6 (ST21).

As a result, in the course of the input code information that has been sent from the companion computer system 10 being converted into code information of the same meaning but of a different code scheme, the code information is efficiently distributed to the plurality of processors 13B through 13D and conversion processing is executed in parallel, which allows the resources of the host system to be utilized more effectively.

Also, with the code conversion units 3a through 3c, the conversion of the code scheme of the code information is executed in parallel, which allows the transfer of the information between computer systems of different code schemes to be accomplished in a shorter time, and allows the response to be increased over an entire information system composed of a plurality of computer systems.

Second Embodiment

The second embodiment is characterized by the fact that, compared to the first embodiment, each of the second processors is furnished with two pairs of conversion units and output units. Here, only the portion of the structure of the second embodiment that is different from that of the first embodiment will be described, while the structure that is the same will be labeled with the same symbols and the description thereof will be omitted.

Figure 4:
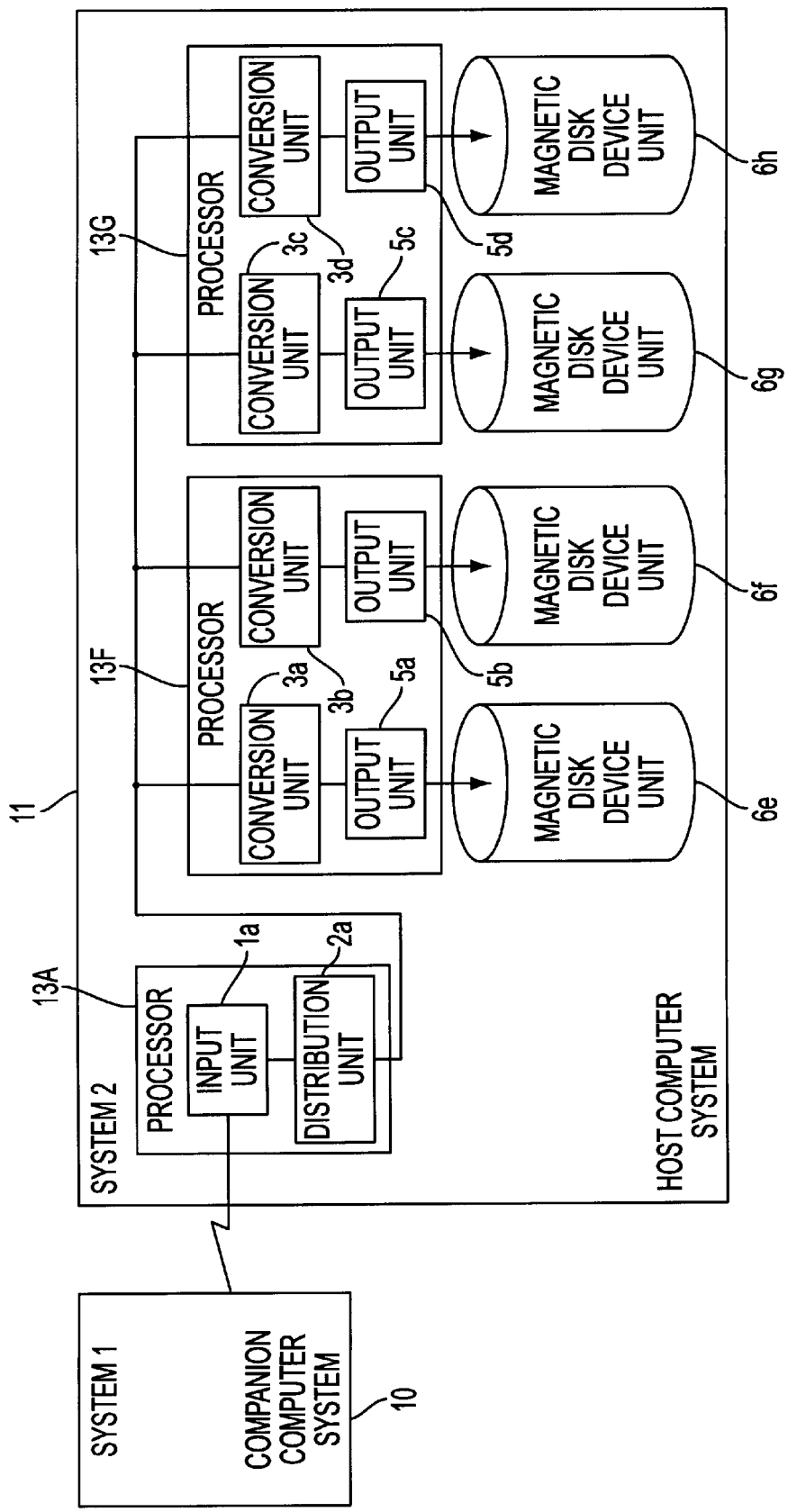
FIG. 4 is a block diagram illustrating a construction of the second embodiment of the present invention.

As shown in FIG. 4, the second processor in the second embodiment is divided into processors 13F and 13G. The processor 13F is provided with code conversion units 3a and 3b and output units 5a and 5b, while the processor 13G is provided with conversion units 3c and 3d and output units 5c and 5d.

With this system, when the signals that have been distributed by the distribution unit 2a are converted from JEF code to SJIS code, for example, by the conversion unit 3a, the converted code information is written to a magnetic disk device unit 6e via the output unit 5a. Similarly, when the code information that has been distributed by the distribution unit 2a are converted from JEF code to SJIS code, for example, by the conversion unit 3b, the converted code information is written to a magnetic disk device unit 6f via the output unit 5b. In the same way, code information is written to a magnetic disk device unit 6g via conversion units 3c and output unit 5c, and code information is written to a magnetic disk device unit 6h via conversion units 3d and output unit 5d.

In the system described above, processors 13F and 13G control the code-conversion of the code information that has been distributed by the distribution unit 2a, and the writing of the converted code information to the magnetic disk device units 6e through 6h. Therefore, the write control of the magnetic disk device units 6e and 6f is performed by the processor 13F, and the write control of the magnetic disk device units 6g and 6h is performed by the processor 13G, which allows the shared processing of the processors 13F and 13G to be faster.

Figure 5:
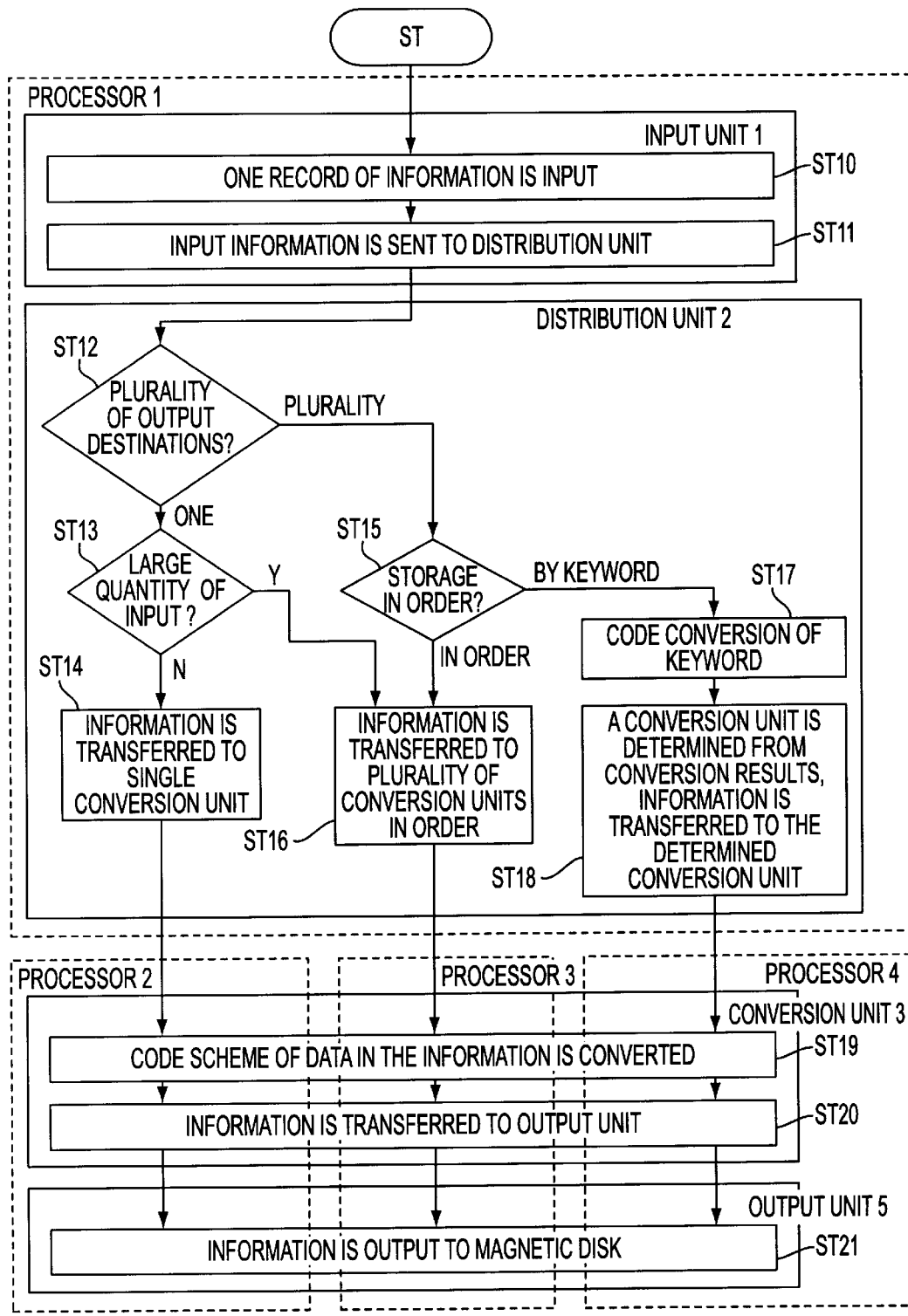
FIG. 5 is a flow chart illustrating the operation of the second embodiment of the present invention.

The operation of this second embodiment will be described in reference to FIG. 5. With this second embodiment, one record of code information from the companion computer system 10 is input to the input unit 1 of the host computer system 11 (ST10).

After the one record of code information has been input to the input unit 1, the input code information is sent to the distribution unit 2 (ST11).

This distribution unit 2 selects from among the plurality of second processors 13F and 13G that operate the magnetic disk device units 6e through 6h, and distributes the code information received by the input unit 1a to the selected second processors 13F or 13G. With this distribution unit 2, a decision is first made as to whether one or a plurality of the processors 13F or 13G will be the distribution destinations, that is, the output destinations (ST12). When it is determined that there is just one output destination, a decision is made as to whether the total number of the records that has been input is large or not (ST13). Here, the criterion for determining whether the quantity of the whole information that have been input is large or not is the magnitude of the blocking coefficient that determines how large information can be stored by the magnetic storage medium 6, for example. The determination of this blocking coefficient is based, for example, on the balance between an increase in apparent memory density of the magnetic storage medium 6 and an increase in input/output speed resulting from a reduction in the number of read or write operations.

When the quantity of the total number of the input records is not large (No in ST13), the code information is sent to only a specific conversion unit 3a of the processor 13F (ST14). After the code information has been sent only to this specific conversion unit 3a of the processor 13F, the code scheme of the data is converted by the code conversion unit 3a of the processor 13F (ST19).

Meanwhile, when it is determined in ST12 that a plurality of the processors 13F and 13G will be the distribution destinations, that is, the output destinations, a decision is made as to whether the code information will be distributed and stored in the magnetic disk device units 6e through 6h according to the input order, or according to a keyword contained in the code information (ST15).

When the code information is distributed and stored in the magnetic disk device units 6e through 6h according to the input order, the code information that has been input is sent, in order, to the plurality of code conversion units 3a through 3d (ST16).

The code conversion units 3a through 3d of the processors 13F and 13G convert the code scheme of the data in the received code information into the code scheme that is used as the standard code scheme in the host computer system 11 (ST19).

When it is determined that the code information will be distributed and stored in the magnetic disk device units 6e through 6h in ST15 according to a keyword contained in the code information, only the code scheme of the keyword is converted into that in the host computer system 11 at first (ST17).

The distribution unit 2a, after performing the code conversion of the keyword, determines the code conversion units 3a through 3d based on the code conversion results, and sends the code information to the determined code conversion units 3a through 3d (ST18).

The code conversion units 3a through 3d of the processors 13F and 13G convert the code scheme of the data in the received code information into the code scheme that is used as the standard code scheme in the host computer system 11 (ST19). For example, they convert the code information from ASCII code to JIS code of the same meaning.

Meanwhile, when it is determined in ST13 that the total number of the input records is large (Yes in ST13), the input code information is sent, in order, to the plurality of code conversion units 3a through 3d (ST16).

In ST19 described above, after the code conversion units 3a through 3d of the processors 13F and 13G have converted the code scheme of the code information, the code information is transferred to the output units 5a through 5d (ST20).

After these output units 5a through 5d have received the code information, the converted code information is sent to the magnetic disk device units 6 (ST21).

As a result, in the course of the input code information that has been sent from the companion computer system 10 being converted into code information of the same meaning but of a different code scheme, the code information is efficiently distributed to the plurality of processors 13F and 13G and conversion processing is executed in parallel, which allows the resources of the host computer system 11 to be utilized more effectively.

Also, with the code conversion units 3a through 3d, the conversion of the code scheme of the code information is executed in parallel, which allows the transfer of the information between computer systems of different code schemes to be accomplished in a shorter time, and allows the response to be increased over an entire information system composed of a plurality of computer systems.

Furthermore, when 2-byte code is converted, the conversion rate is from 10 to 100 times faster than when 1-byte code is converted, so this is favorable for the conversion of 2-byte code.

Third Embodiment

With the third embodiment, a code information joining unit 4 that joins the plurality of pieces of the code information that has been divided by the distribution unit 2 is provided and code-converted in the conversion units 3, and the code information that has been joined by this code information joining unit 4 is written to the magnetic disk device unit 6 via an output unit 5.

Since the conversion to a different code scheme is executed in parallel through the use of a plurality of processors prior to the code information being written to the magnetic disk device unit 6, conversion to code information of a different code scheme is faster.

Construction of the Third Embodiment

Figure 6:
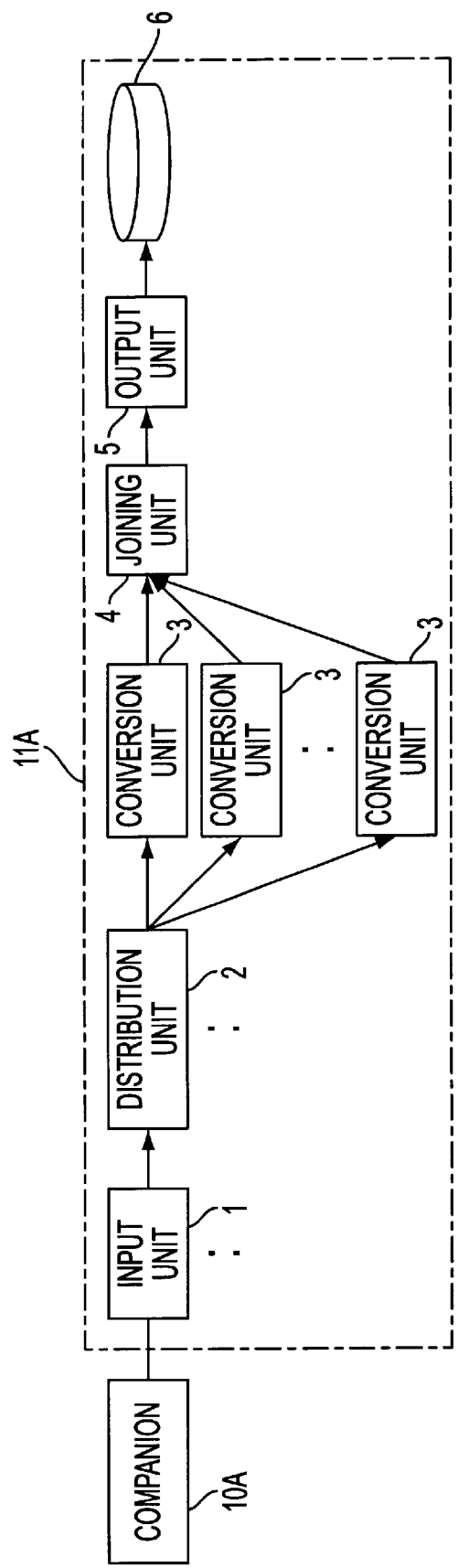
FIG. 6 is a block diagram illustrating the essentials of the third embodiment of the present invention.

FIG. 6 is a block diagram of the third embodiment of the present invention. Those points that differ from the structure of the first embodiment described above will be described in detail, while the structure that is the same will be labeled with the same symbols and the description thereof will be omitted.

In the third embodiment, a code information joining unit 4 is provided, which joins the plurality of pieces of code information that has been divided into a plurality of groups by the distribution unit 2 and code-converted in the conversion units 3 in the order of input, or in an arranged order. The code information that has been joined by this code information joining unit 4 is written to the magnetic disk device unit 6 via the output unit 5.

When the information written to the magnetic disk device unit 6 is transferred to the host computer system 11, a plurality of processors can be utilized to execute the conversion to a different code scheme in parallel before the code information is joined into a single group of information by the code information joining unit 4. Therefore, conversion of the code scheme of the input code information into a different code scheme is faster.

Figure 7:
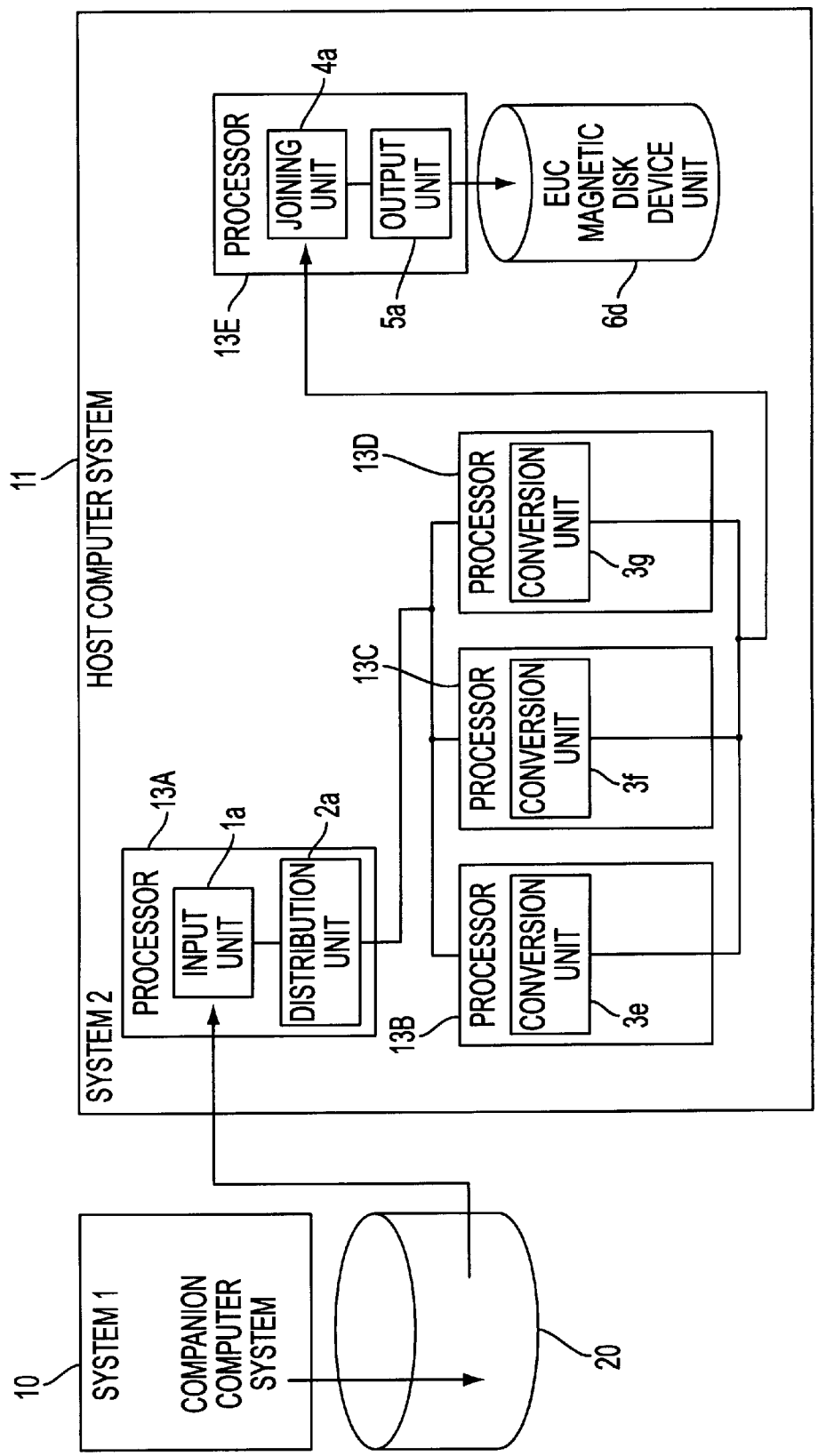
FIG. 7 is a block diagram illustrating a specific construction of the third embodiment of the present invention.

FIG. 7 is a block diagram illustrating in further detail the structure of the block diagram in FIG. 6.

In FIG. 7, the code information sent from the companion computer system 10 of the system 1 is temporarily stored in a magnetic disk device unit 20 that is connected by a communication line or the like.

After the code information has been stored in the magnetic disk device unit 20, this code information is input to the input unit 1a within the processor 13A of the host computer system 11 of the system 2.

The code information that has been input to the input unit 1a is distributed to any of the processors 13B through 13D by the distribution unit 2a. This distribution unit 2a determines which of the code conversion units 3e through 3g of the processors 13B through 13D will be optimum to perform the code conversion of which code information, according to an order code, segment code, classification code, or the like.

After the code information has been converted by the processors 13B through 13D, the joining unit 4a of the processor 13E joins the three pieces of code information in the input order. The joined code information is then written to the magnetic disk device unit 6d via the output unit 5a.

Operation of the Third Embodiment

Figure 8:
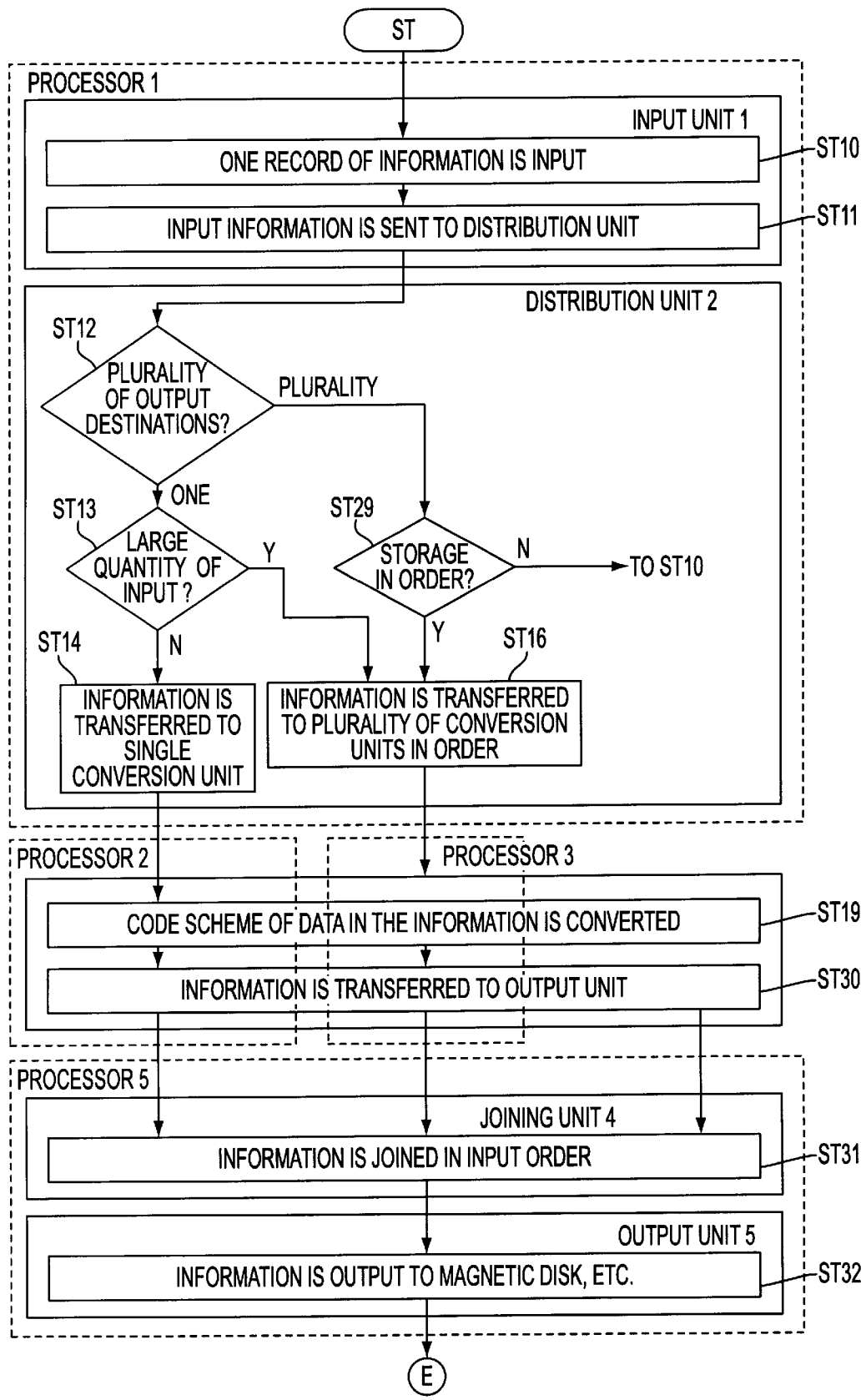
FIG. 8 is a flow chart illustrating the operation of the third embodiment of the present invention.

The operation of the third embodiment will be described in reference to FIG. 8.

In this embodiment, one record of code information from the companion computer system 10 is to the input unit 1a of the host computer system 11 (ST10).

After one record of code information has been input to the input unit 1a, the input code information is sent to the distribution unit 2 (ST11).

This distribution unit 2 selects from among the plurality of second processors 13B through 13D, and distributes the code information received by the input unit 1a. With this distribution unit 2, a decision is first made as to whether one or a plurality of the processors 13B through 13D will be the distribution destinations, that is, the output destinations (ST12). When it is determined that there is just one output destination, a decision is made as to whether the total number of the records that has been input is large or not (ST13). Here, the criterion for determining whether the quantity of the total number of the records is large or not is the magnitude of the blocking coefficient that determines how large information can be stored by a magnetic storage medium 6. The determination of this blocking coefficient is based, for example, on the balance between an increase in apparent memory density of the magnetic storage medium 6 and an increase in input/output speed resulting from a reduction in the number of read or write operations.

When the total number of the input records is not large (No in ST13), the code information is sent to only a specific conversion unit 3e of the processor 13B (processor 2) (ST14). After the information has been sent only to this specific conversion unit 3e of the processor 13B (processor 2), the code scheme of the data is converted by the code conversion unit 3e of the processor 13B (processor 2) (ST19).

Meanwhile, when it is determined in ST12 that a plurality of the processors 13B through 13D will be the distribution destinations, that is, the output destinations, a decision is made as to whether the code information will be distributed to the code conversion units 3e through 3g according to the input order (ST29).

When the code information is distributed to the code conversion units 3e through 3g according to the input order, the code information that has been input is sent, in order, to the plurality of code conversion units 3e through 3g (ST16).

The code conversion units 3e through 3g of the processors 13B through 13D convert the code scheme of the data in the received code information into the code scheme that is used as the standard code scheme in the host computer system 11 (ST19).

When it is determined in ST29 that the code information will not be distributed to the code conversion units 3e through 3g according to the input order, the procedure goes back to ST10 and one record of code information is input.

Meanwhile, when it is determined in ST13 that the total number of the input records is large (Yes in ST13), the input code information is sent, in order, to the plurality of code conversion units 3e through 3g (ST16).

Also, after the code information has been converted by the code conversion units 3e through 3g of the processors 13B through 13D in ST19 described above, the code information is sent to the code information joining unit 4a of the processor 13E (ST30).

When the code information is input to this code information joining unit 4a, the code information joining unit 4a joins the input pieces of code information in the input order (ST31). The code information can also be joined in rearranged order different from the order in which the code information were input.

The code information joined into a single group of data by this code information joining unit 4a is transferred to the output unit 5a. In the output unit 5a, the code information is quickly file processed and written to the magnetic disk device unit 6d.

As described above, a code information joining unit 4 is provided, which joins the plurality of pieces of code information that was divided into a plurality of groups by the distribution unit 2 and code-converted by the conversion units 3, so that the code information joined by this code information joining unit 4 can be written to the magnetic disk device unit 6 via the output unit 5a.

When the information written to the magnetic disk device unit 6 is transferred to the host computer system 11, a plurality of processors can be utilized to convert the code scheme of the code information into a different code scheme in parallel before the code information is joined by the code information joining unit 4 into a single group of information. Therefore, the conversion of the code scheme of the input code information into a different code scheme is faster.

Fourth Embodiment

In the fourth embodiment, code information from a data base within the host computer system 11B is converted in parallel into code information that suits the companion computer system by a plurality of conversion units, thereafter the converted data is joined such that the resulting format will be easy to write the data base of the companion computer system 10B and it is sent to the companion computer system. As a result, the processing that is needed to convert the code scheme of the code information into a different code scheme can be omitted in the companion computer system 10B, and the processing in the companion computer system 10B will be faster.

Construction of the Fourth Embodiment

Figure 9:
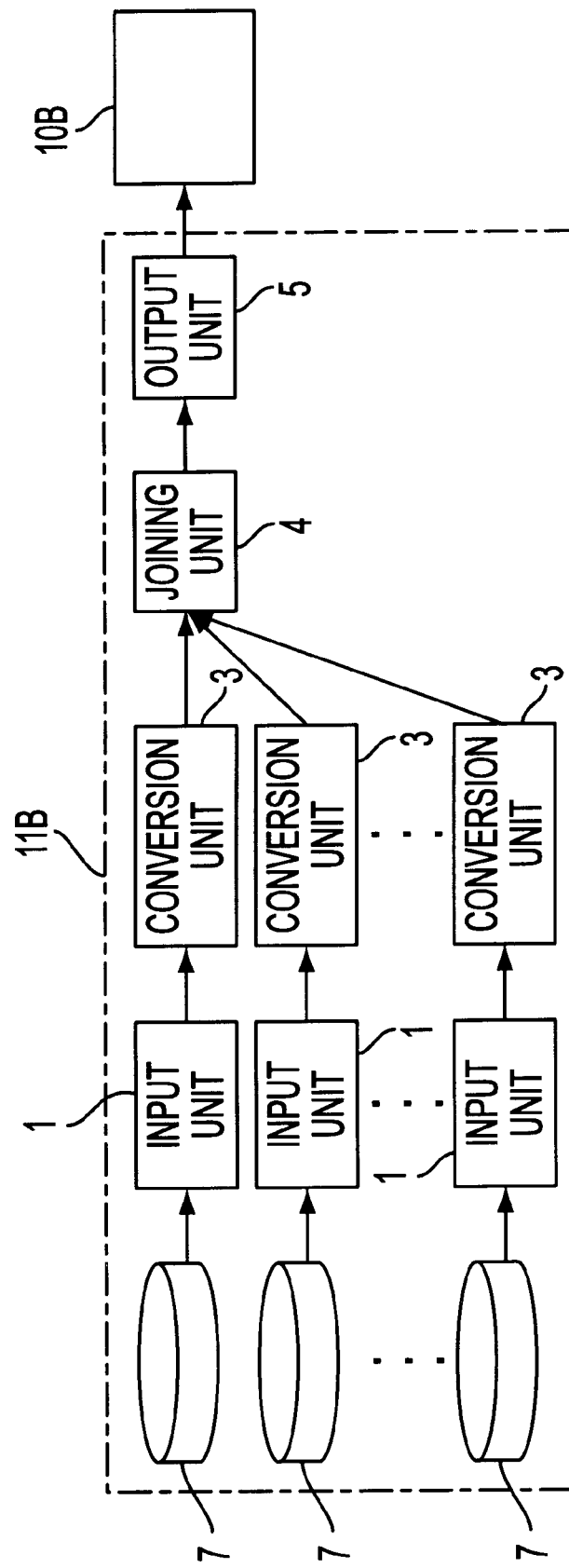
FIG. 9 is a block diagram illustrating the essentials of the fourth embodiment of the present invention.

FIG. 9 is a block diagram of the system structure in the fourth embodiment of the present invention. In this block diagram, there are a plurality of data bases 7 in which are written code information that is to be sent to the companion computer system 10B.

Each code information read from each data base 7 is input to a corresponding input unit 1, respectively. The code information input to this input unit 1 is converted from that of the code scheme used as the standard code scheme in the host computer system 11 into that of the different code scheme that is used as the standard code scheme in the companion computer system 10B by the conversion units 3.

The plurality of the pieces of code information converted by the code conversion units 3 are joined as a single group of information by the code information joining unit 4 so as to achieve a file format that is easy to write to the data base of the companion computer system 10B.

The output unit 5 outputs the code information joined by the code information joining unit 4 in the form of a transmission signal to be transmitted to the companion computer system 10B.

Figure 10:
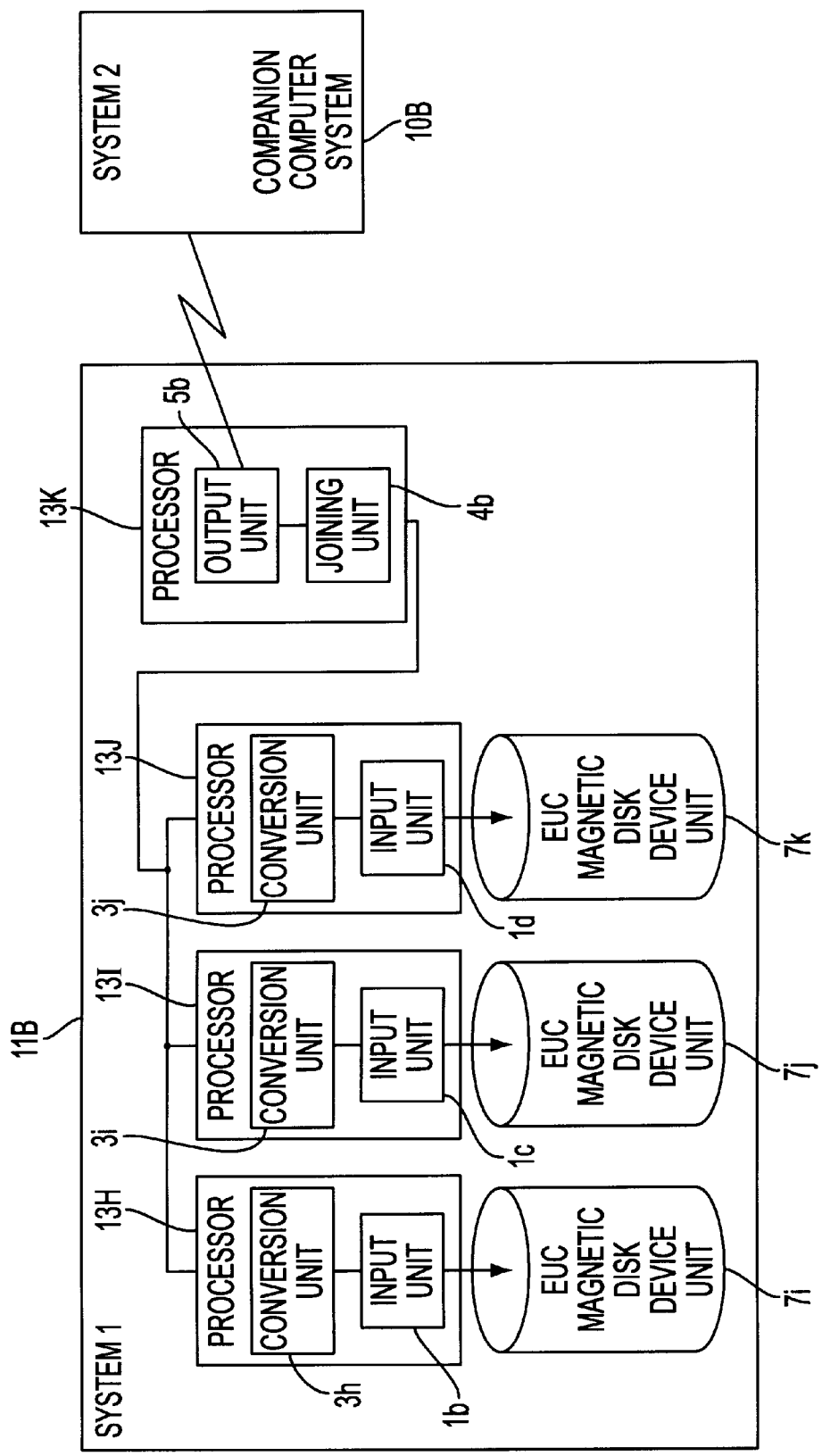
FIG. 10 is a block diagram illustrating a specific construction of the fourth embodiment of the present invention.

FIG. 10 is a block diagram illustrating the block diagram in FIG. 9 in further detail. In FIG. 10, the system 1 is a host computer system 11B, and the system 2 is a companion computer system 10B.

This host computer system 11B is provided with magnetic disk device units 7i through 7k in which input information has been previously written.

The processors 13H through 13J are provided with input units 1b through 1d to which the input information read from the magnetic disk device units 7i through 7k is input, and with code conversion units 3h through 3j that convert the code information input to these input units 1b through 1d into code information of the same meaning but of a different code scheme.

For example, when the code scheme used in the host computer system 11B is ASCII code and the code scheme used in the companion computer system 10B is JIS code, code conversion from ASCII code into JIS code of the same meaning is performed by the code conversion units 3h through 3j.

The three pieces of code information converted by the code conversion units 3h through 3j are joined according to the order of input by the joining unit 4b of the processor 13K so that it will be written to the data base of the companion computer system 10B. Alternatively, they are joined according to a rearranged order different from the order of the input.

The output unit 5b outputs the code information joined by the joining unit 4b to the companion computer system 10B in the form of a signal that is sent to the companion computer system 10B via a communication line or the like.

Operation of the Fourth Embodiment

Figure 11:
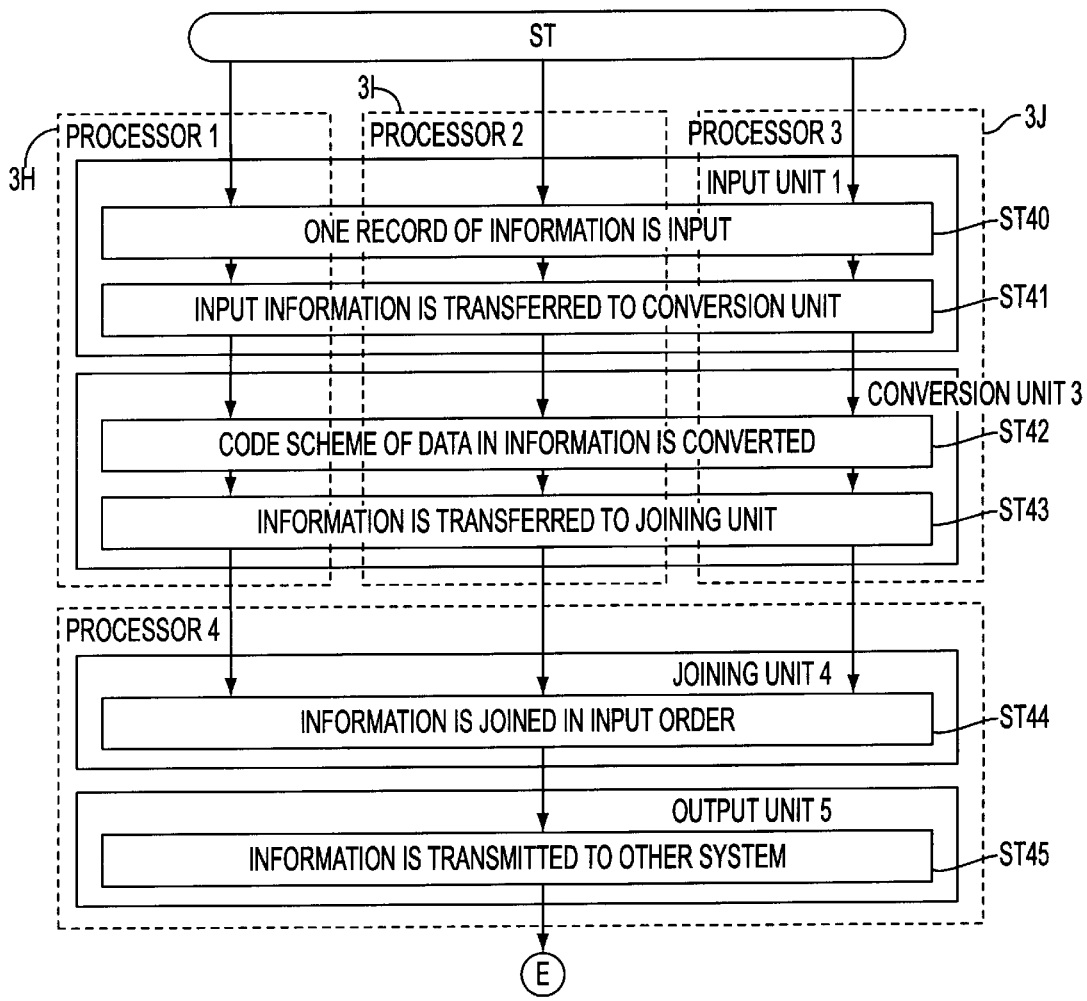
FIG. 11 is a flow chart illustrating the operation of the fourth embodiment of the present invention.
Figure 14:
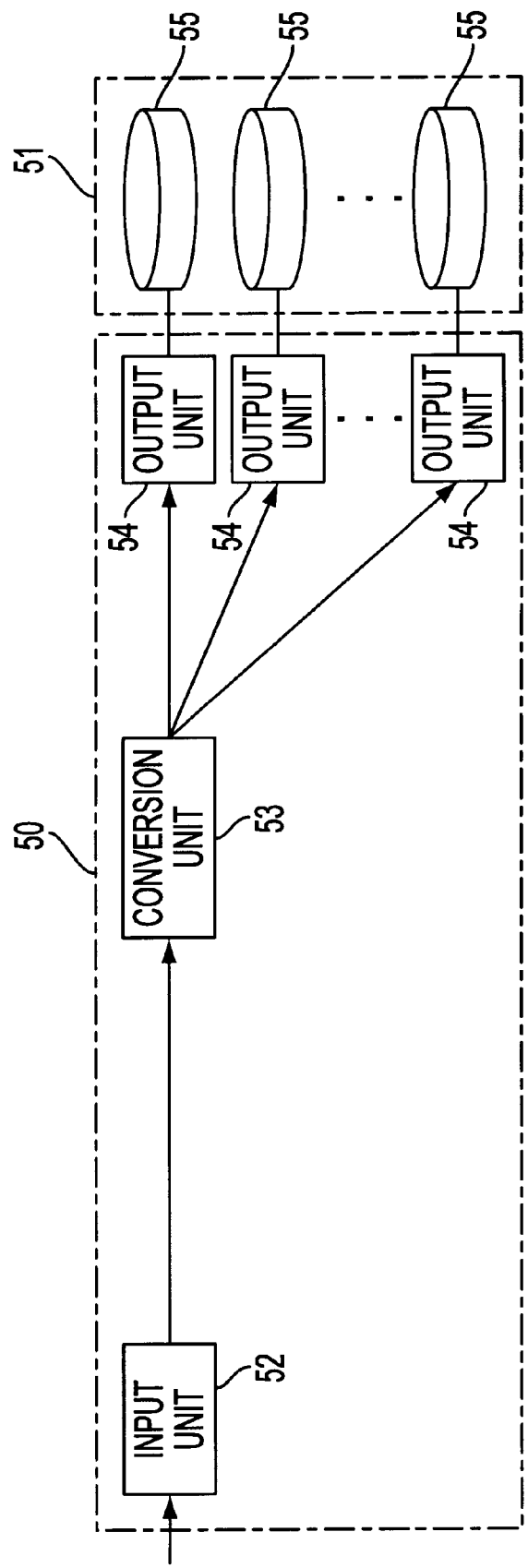
FIG. 14 is a block diagram illustrating is a block diagram showing an example of a conventional code conversion processing apparatus.

The operation of this fourth embodiment will be described in reference to FIG. 11.

In this embodiment, one record of information from each magnetic disk device unit 7i through 7k within the host computer system 11B is input to the corresponding input unit 1b through 1d (ST40), respectively.

After one record of information has been input to the input units 1b through 1d, this input code information is input to the code corresponding conversion unit 3h through 3j, respectively (ST41).

These code conversion units 3h through 3j convert the code scheme of the input code information from the code scheme that is used as the standard code scheme in the host computer system 11B into the code scheme that is used as the standard code scheme in the companion computer system 10B (ST42).

The code information converted by these code conversion units 3h through 3j is sent to the code information joining unit 4b (ST43).

This code information joining unit 4b joins the input code information according to the order of input based on the transmission command from the companion computer system 10B (ST44).

The code information sent from this code information joining unit 4b is transmitted via a communication line or the like to the data base of the companion computer system 10B (ST45).

The above processing allows the transmission and receipt of information between computer systems of different code schemes to be carried out quickly.

In Embodiments 1 through 4 described above, code information that has been sent from a companion computer system 10 having a certain rule scheme for expressing information in code is input to a host computer system 11 having a different rule scheme. The code conversion between different code schemes, which accounts for the majority of the transfer processing of the input code information, is then distributed to a plurality of processors and executed simultaneously and in parallel. This efficient distribution of the processors within the host computer system allows the resources within the host computer system to be utilized more effectively.

Accordingly, with this method for conversion processing between different code schemes it is possible to transfer information between computer systems of different code scheme in a shorter time, and it is also possible to increase the response over an entire information system composed of a plurality of computer systems.

The invention being thus described, it will obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A parallel code conversion processing method, comprising the steps of:

dividing character code information into plural pieces, the character code information representing a predetermined set of data arranged in an input order and encoded according to a first code scheme used in a first computer system;

transferring the plural pieces of character code information respectively to a plurality of processing units; and converting the character code information from the first code scheme into a second code scheme used in a second computer system by converting the plural pieces of the character code information in parallel on the respective processing units to generate plural pieces of converted character code information representing the predetermined set of data encoded according to the second code scheme.

2. A parallel code conversion processing method as defined in claim 1, further comprising the steps of:

specifying a keyword included in the character code information;

converting the specified keyword from the first code scheme to the second code scheme before transferring the character code information in plural pieces to the respective processing units; and wherein the plural pieces of character code information are transferred to corresponding ones of the processing units according to a result of converting the specified keyword.

3. A parallel code conversion processing method as defined in claim 1, wherein the character code information is distributed to a selected number of the plurality of processing units, the number being selected in accordance with an amount of the character code information.

4. A parallel code conversion processing method as defined in claim 1, further comprising the step of joining the plural pieces of converted character code information into a single group of converted character code information according to a selected one of the input order and a rearranged order different from the input order.

5. A parallel code conversion processing method as defined in claim 1, wherein:
the first computer system is a companion system transferring the character code information to the second computer system; and
the second computer system is a host system receiving the character code information from the first computer system.

6. A parallel code conversion processing method as defined in claim 1, further comprising the step of determining a distribution rule for transferring the character code information to the plurality of processing units, the distribution rule specifying one of distribution according to the input order and distribution according to a specified keyword included in the character code information.

7. A parallel code conversion processing method as defined in claim 1, further comprising the step of storing the plural pieces of converted character code information in a storage medium of the second computer system when the character code information has been converted from the first code scheme into the second code scheme.

8. A parallel code conversion processing method as defined in claim 2, wherein the storage medium on the second computer system is designated in advance.

9. A parallel code conversion processing method, comprising the steps of:
reading character code information from a plurality of storage media included in a first computer system, the character code information being stored in a distributed state across the plural storage media and representing a predetermined set of data encoded according to a first code scheme used in the first computer system;
converting the character code information from the first code scheme to a second code scheme used in a second computer system by converting plural pieces of the character code information in parallel to generate a plurality of pieces of converted character code information representing the predetermined set of data encoded according to the second code scheme;
specifying a successive order in which the plurality of pieces of converted character code information are to be joined, the specified order conforming the converted character code information to a predetermined file format; and
joining the plural pieces of converted character code information into a single group of converted character code information according to the specified order.

10. A parallel code conversion processing method as defined in claim 9, wherein:
the specified order is different from an initial order in which the plural pieces of converted character code information are received for joining; and
the joining step includes the steps of receiving the plural pieces of character code information in the initial order and and rearranging the plural pieces of character code information into the specified order.

11. A parallel code conversion processing method, comprising the steps of:

determining an amount of character code information formatted in a first code scheme for use in a first computer system and comprising one or more records;
distributing the character code information to a single processing unit when the amount is less than or equal to a predetermined value;
distributing each record of the character code information in plural pieces to a plurality of processing units when the amount is greater than the predetermined value; and
converting each of the records of the character code information in parallel from the first code scheme into a second code scheme used in a second computer system by converting each of the plural pieces of the record with a corresponding one of the plurality of processing units when the amount is greater than the predetermined value.

12. A parallel code conversion processing method as defined in claim 11, wherein the predetermined value is determined according to a blocking coefficient of a storage medium of the second computer system.

13. A parallel code conversion processing method as defined in claim 12, wherein the blocking coefficient is determined based on a balance between an increase in apparent memory density of the storage medium and an increase in input/output speed resulting from a reduced number of read/write operations.

14. A parallel code conversion processing system, comprising:
a distribution unit that divides character code information into plural pieces and respectively transfers the plural pieces of character code information for code conversion thereof, the character code information representing a predetermined set of data arranged in an input order and encoded according to a first code scheme used in a first computer system; and
a plurality of conversion units that respectively receive the plural pieces of character code information transferred by said distribution unit and execute conversion processing in parallel on the plural pieces of character code information to generate a plurality of pieces of converted character code information representing the predetermined set of data encoded according to a second code scheme used in a second computer system, whereby the plural pieces of character code information are converted in parallel from the first code scheme into the second code scheme.

15. A parallel code conversion processing system as defined in claim 14, wherein said distribution unit transfers the plural pieces of character code information to a selected number of said plurality of processing units, the number being selected in accordance with an amount of the character code information.

16. A parallel code conversion processing system as defined in claim 14, further comprising a joining unit that joins the plural pieces of converted character code information into a single group of converted character code information according to a selected one of the input order and a rearranged order different from the input order.

17. A parallel code conversion processing system as defined in claim 14, wherein said distribution unit transfers the plural pieces of character code information according to a predetermined distribution rule specifying one of distribution according to the input order and distribution according to a specified keyword included in the character code information.

18. A parallel code conversion processing system as defined in claim 14, further comprising a plurality of storage media respectively storing the plural pieces of converted character code information.

19. A parallel code conversion processing system as defined in claim 18, wherein said distribution unit transfers each piece of character code information to a previously designated one of the conversion units.

20. A parallel code conversion processing system as defined in claim 19, wherein:

said distribution unit converts a specified keyword from the first code scheme into the second code scheme; and the conversion units are designated for transfer thereto of respective pieces of the character code information according to a result of converting the specified keyword.

21. A parallel code conversion processing system, comprising:

a plurality of read units reading character code information from a plurality of storage media of a first computer system, the character code information being stored in a distributed state across the plural storage media and representing a predetermined set of data encoded according to a first code scheme used in the first computer system;

a plurality of conversion units that convert the character code information from the first code scheme to a second code scheme used in a second computer system by converting plural pieces of the character code information in parallel to generate plural pieces of converted character code information representing the predetermined set of data encoded according to the second code scheme; and a joining unit that joins the plural pieces of converted character code information into a single group of converted character code information according to a specified successive order in which the plural pieces of converted character code information are to be joined.

22. A parallel code conversion processing system as defined in claim 21, wherein:

the specified order is different from an initial order in which the plural pieces of converted character code information are received for joining; and said joining unit receives the plural pieces of converted character code information in the initial order and joins the plural pieces of converted character code information in the specified order.

23. A parallel code conversion processing system, comprising:

a plurality of processors that execute parallel conversion processing of character code information from a first code scheme used in a first computer system into a second code scheme used in a second computer system, the character code information representing a predetermined set of data arranged in an input order and encoded according to the first code scheme, each processor comprising a plurality of conversion units that convert respective portions of the character code information from the first code scheme into the second code scheme under control of the processor;

a distribution unit that divides the character code information into plural pieces and transfers the plural pieces of character code information to said plurality of processors; and a plurality of storage units respectively coupled to said processors, each storage unit receiving converted character code information output from a corresponding conversion unit of said respective processor and storing the received converted character code information under control of said respective processor.

24. A parallel code conversion processing system as defined in claim 23, wherein said distribution unit transfers the plural pieces of character code information to said processors according to a predetermined distribution rule specifying one of distribution according to the input order and distribution according to a specified keyword included in the character code information.

25. A parallel code conversion processing system, comprising:

a plurality of processors executing code conversion of character code information from a first code scheme used in a first computer system into a second code scheme used in a second computer system; and a distribution unit distributing the character code information to a single one of said processors when an amount of the character code information is less than or equal to a predetermined value, and distributing the character code information in plural pieces to a plurality of said processors for conversion thereof in parallel when the amount is greater than the predetermined value.

26. A computer-readable medium encoded with a program for executing parallel code conversion, said program comprising the functions of:

dividing character code information into plural pieces, the character code information representing a predetermined set of data arranged in an input order and encoded according to a first code scheme used in a first computer system;

transferring the plural pieces of character code information to a plurality of processing units; and converting the character code information from the first code scheme into a second code scheme used in a second computer system by converting the plural pieces in parallel on respective processing units to generate plural pieces of converted character code information representing the predetermined set of data encoded according to the second code scheme.

* * * * *